UNITED STATES PATENT OFFICE.

JAMES F. WILLIAMS, OF SAN FRANCISCO, CALIFORNIA.

COMPOSITION AND PROCESS FOR EXTRACTING METALS FROM THEIR ORES.

1,145,954.     Specification of Letters Patent.     Patented July 13, 1915.

No Drawing.     Application filed January 2, 1912. Serial No. 668,958.

*To all whom it may concern:*

Be it known that I, JAMES F. WILLIAMS, a citizen of the United States, residing at San Francisco, in the county of San Francisco, State of California, have invented certain new and useful Improvements in Compositions and Processes for Extracting Metals from Their Ores; and I do hereby declare the following to be a full, clear, and exact description of the invention, such as will enable others skilled in the art to which it appertains to make and use the same.

This invention relates to certain novel and useful improvements in a process of and solution for treating precious-metal bearing ores, and has particular application to the freeing of precious metals such as gold, silver and platinum from silicious ores and placer sands, my object being to provide a process and solution by which the metal may be economically freed from the materials with which it is associated so that such metals may readily amalgamate.

In carrying out my process, the ore or sand is first pulverized and screened, the degree of fineness being governed by the character of the ore. The pulverized ore is then allowed to stand for a number of hours in a special solution or bath, the formula of which will hereinafter be given, after which the solution is run off and the ore is flushed or run from the tank in which it has been treated over amalgam plates and so amalgamated, this part of the process being similar to the ordinary stamp mill amalgamation process. The amalgam is then retorted in the usual manner to free the metal from the mercury.

In practising the invention, the bath is preferably prepared in two parts having the following proportions: One ounce of concentrated sulfuric acid is thoroughly mixed with sixteen ounces of water to form the first part of the bath and forty grains of potassium bromid is then dissolved in two ounces of water to make the second part of the bath. The potassium bromid solution is then added to the acid solution. The solution thus formed may be diluted with water to attain the proper strength for a specific use, the strength of the solution employed of course being governed by the character of the ore treated. The proportions above given, I have found by experience to be desirable for practicable use, although it will of course be understood that the proportion may be varied to suit the occasion. As a rule, ten hours immersion of the ore in this solution is sufficient, but the length of time required depends of course upon the strength of the solution employed and the character and fineness of the ore undergoing the treatment. The solution when drawn off may be retained and used again.

From the foregoing it will be apparent that I have provided a simple process and solution for freeing metals from their ores in the solution employed in the process being readily and economically manufactured.

What I claim is:

1. The herein-described process in freeing precious metals from their ores which consists in treating the ore with a bath composed of water, sulfuric acid and potassium bromid.

2. The herein-described process in freeing precious metals from their ores which consists in treating the ore with a bath composed of water, sulfuric acid and potassium bromid in substantially the proportion of eighteen ounces of water, one ounce of sulfuric acid and forty grains of potassium bromid.

3. The herein-described solution for freeing precious metals from their ores consisting of water, sulfuric acid and potassium bromid.

4. The herein-described solution for freeing precious metals from their ores consisting of water, sulfuric acid and potassium bromid in substantially the proportion of eighteen ounces of water, one ounce of sulfuric acid and forty grains of potassium bromid.

5. The process of separating precious metals from their ores which consists in treating the ore with a mixture of a solution of sulfuric acid and a solution of potassium bromid and bringing the mass into contact with mercury.

In testimony whereof, I affix my signature, in presence of two witnesses.

JAMES F. WILLIAMS.

Witnesses:
FRED B. SANFORD,
NORMA B. PERL.

Copies of this patent may be obtained for five cents each, by addressing the "Commissioner of Patents, Washington, D. C."